(12) United States Patent
Hansen

(10) Patent No.: US 11,855,576 B2
(45) Date of Patent: Dec. 26, 2023

(54) METHOD FOR OPERATING A PERMANENT MAGNET GENERATOR IN THE EVENT OF A FAULT

(71) Applicant: VESTAS WIND SYSTEMS A/S, Aarhus (DK)

(72) Inventor: Kenneth G. Hansen, Kjellerup (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 17 days.

(21) Appl. No.: 18/085,353

(22) Filed: Dec. 20, 2022

(65) Prior Publication Data

US 2023/0198434 A1    Jun. 22, 2023

(30) Foreign Application Priority Data

Dec. 20, 2021  (DK) ........................ PA 2021 70639

(51) Int. Cl.

| | |
|---|---|
| *H02P 9/00* | (2006.01) |
| *H02P 29/024* | (2016.01) |
| *H02K 7/18* | (2006.01) |
| *H02P 29/032* | (2016.01) |
| *H02P 29/028* | (2016.01) |

(52) U.S. Cl.
CPC ............. *H02P 9/006* (2013.01); *H02K 7/183* (2013.01); *H02P 29/027* (2013.01); *H02P 29/028* (2013.01); *H02P 29/032* (2016.02)

(58) Field of Classification Search
CPC ....... H02K 7/183; H02P 9/006; H02P 29/027; H02P 29/028; H02P 29/032
USPC .................................................. 310/68 B, 71
See application file for complete search history.

(56) References Cited

U.S. PATENT DOCUMENTS

| | | |
|---|---|---|
| 2007/0030606 A1 | 2/2007 | Ganev et al. |
| 2010/0232076 A1 | 9/2010 | Ganev et al. |
| 2011/0140424 A1 | 6/2011 | Edenfeld |

(Continued)

FOREIGN PATENT DOCUMENTS

| | | |
|---|---|---|
| EP | 2602893 A1 | 6/2013 |
| EP | 3522362 A1 | 8/2019 |

(Continued)

OTHER PUBLICATIONS

European Patent Office, Extended European Search Report for Application 22214834.8-1202 dated Apr. 5, 2023.

(Continued)

*Primary Examiner* — Rashad H Johnson
(74) *Attorney, Agent, or Firm* — Patterson + Sheridan, LLP

(57) ABSTRACT

The present invention relates to a method for operating a power generating assembly in the event of a fault, wherein the power generating assembly comprises a PMG comprising at least first and second sets of stator windings, wherein each set of stator windings is connected to a power converter via a controllable circuit breaker, the method comprising the steps of detecting a fault associated with the first set of stator windings, and lowering, such as interrupting, the current in the second set of stator windings, and, after a predetermined delay, lowering, such as interrupting, the current in the first set of stator windings. The present invention also relates to a power generating assembly being capable of handling such faults, and a wind turbine generator comprising such a power generating assembly.

15 Claims, 5 Drawing Sheets

(56) References Cited

U.S. PATENT DOCUMENTS

| | | | |
|---|---|---|---|
| 2013/0194704 A1 | 8/2013 | Lewis | |
| 2014/0306583 A1 | 10/2014 | Moller | |
| 2016/0285251 A1 | 9/2016 | Urresty | |
| 2017/0279391 A1* | 9/2017 | Freire | ............... H02P 9/42 |
| 2019/0137568 A1* | 5/2019 | Freire | ............... F03D 17/00 |
| 2021/0028731 A1* | 1/2021 | Freire | ............... H02P 9/006 |
| 2022/0006414 A1* | 1/2022 | Freire | ............... H02H 7/1216 |

FOREIGN PATENT DOCUMENTS

| | | |
|---|---|---|
| EP | 3811481 A1 | 4/2021 |
| GB | 2518989 A | 4/2015 |
| WO | 2020128058 A1 | 6/2020 |

OTHER PUBLICATIONS

Danish Patent Office, Search Report for Danish Patent Application No. PA 2021 70639, dated Jun. 9, 2022.

* cited by examiner

METHOD FOR OPERATING A PERMANENT MAGNET GENERATOR IN THE EVENT OF A FAULT

FIELD OF THE INVENTION

The present invention relates to a method for operating a power generating assembly comprising a permanent magnet generator (PMG) in the event of a fault associated with one set of stator windings. The present invention further relates to a power generating assembly being capable of handling such faults, and a wind turbine generator comprising such a power generating assembly.

BACKGROUND OF THE INVENTION

The present invention is primarily relevant for PMG related applications—in particular PMGs where the stator comprises at least two sets of stator windings.

As the name indicates, a PMG is a generator with permanent magnets in the rotor circuit. Due to these permanent magnets, the rotor is always magnetically exited and will thus generate power whenever the rotor is rotating and at least one set of the stator windings forms part of a closed circuit/loop.

As the PMG generates power whenever it is rotated, a protective device in the form of for example a controllable circuit breaker is needed as close as possible to the PMG. The controllable circuit breaker is configured to disconnect and interrupt the generated power from the PMG in the event of a fault, such as in the event of a short circuit associated with one of the stator windings, i.e. in one of the closed circuits/loops.

In the event of a short circuit in one of the closed circuits/loops, the PMG will, due to its nature, continue to feed power into the fault until the circuit breaker associated with the faulty circuit/loop has interrupted the PMG fault current. However, a PMG fault current is often very difficult to interrupt by a circuit breaker for the following reasons:

- The PMG fault current can be extremely inductive which is more difficult to interrupt
- The PMG fault current is typically very asymmetric where a current zero crossing is not guaranteed within the first cycles
- The transient period, i.e. before steady stead current is reached, can be longer that 500 ms
- Standard circuit breaker architecture is developed for a fixed grid frequency, such as 50/60 Hz. However, the PMG frequency can be much higher which increases the risk of re-ignition in the circuit breaker arc chutes
- Mutual coupling from other sets of stator windings in the PMG will contribute to the PMG fault current
- Recovery of the back electromotive force (BEMF) voltage after fault interruption Due to the above listed difficulties, it is a very challenging task to identify circuit breakers that are suitable for interrupting PMG fault currents.

It may thus be seen as an object of embodiments of the present invention to provide a method and an arrangement for lowering or interrupting PMG fault currents in a safe manner.

It may be seen as a further object of embodiments of the present invention to provide a method and an arrangement that ensures that the smallest possible PMG fault current is interrupted.

DESCRIPTION OF THE INVENTION

The above-mentioned object is complied with by providing, in a first aspect, a method for operating a power generating assembly in the event of a fault, wherein the power generating assembly comprises a PMG comprising at least first and second sets of stator windings, wherein each set of stator windings is connected to a power converter via a controllable circuit breaker, the method comprising the steps of detecting a fault associated with the first set of stator windings, and lowering, such as interrupting, the current in the second set of stator windings, and, after a predetermined delay, lowering, such as interrupting, the current in the first set of stator windings.

Thus, the present invention relates, in its first aspect, to a method where the current in a healthy second set of stator windings, i.e. not faulty stator windings, is lowered, such as interrupting, prior to lowering the current in the faulty first set of stator windings. This is advantageous in that the current in a healthy second set of stator windings contributes significantly to the PMG fault current in the first set of stator windings due to a mutual coupling between sets of stator windings, including the first and second sets of stator windings, in the PMG. Thus, by lowering, such as interrupting, the current in a healthy second set of stator windings, the PMG fault current in the first set of stator windings is also lowered and thus easier to interrupt with a circuit breaker.

The mutual coupling from the healthy second set of stator windings to the faulty first set of stator windings may increase the PMG fault current by 320%.

The method according to the first aspect may be implemented in one or more wind turbine generators forming a wind power plant.

In the present context the term "fault" should be understood as any electrical fault, including a short circuit, in a closed circuit and/or in a power converter associated with a stator winding.

With respect to the power converters, each power converter may comprise at least an AC/DC converter where the AC terminals of each power converter is adapted to receive power from the PMG. The DC terminals of each power converter may be connected to a DC grid which may be either onshore or offshore. Alternatively, each power converter may further comprise a DC/AC converter separated from the AC/DC converter by a DC-link thus forming a full-scale frequency converter. Both the AC/DC and DC/AC converters comprise controllable switches typically in the form of insulated gate bipolar transistors (IGBTs). The nominal power of the PMG may be several MWs. The power converters and the sets of stator windings of the PMG may be connected in various ways. In one approach a distinct and separate power converter may be connected to each set of stator windings, whereas in another approach a power converter may be connected to several sets of stator windings.

The term "lowered" should be understood broadly. Thus, the currents in the first and second sets of stator windings may in principle be reduced to lower current levels in the event of a fault, although an interruption of the currents, and thus a complete nullification of the currents, in the first and second sets of stator windings may be preferred in the event of a fault.

The current in the second set of stator windings may be interrupted by bringing the controllable circuit breaker connected to the second set of stator windings into a none-conducting state of operation. Similarly, the current in the first set of stator windings may be interrupted by bringing the controllable circuit breaker connected to the first set of stator windings into a none-conducting state of operation.

By bringing the circuit breakers connected to the first and second sets of stator windings into none-conducting states of operation the currents in these sets of stator windings are effectively interrupted, i.e. nullified.

It should be noted that the controllable IGBTs of the AC/DC and/or DC/AC converters may optionally also be controlled in a manner to lower/interrupt the current in the first and/or second set of stator windings. For example, the current in the second set of stator windings (healthy stator windings) may be interrupted using the controllable IGBTs if the PMG is operating at lower RPMs and thus with a lower VBEMF. With a lower VBEMF the associated controllable circuit breaker has an increased current interrupting capability due to the lower voltage. Also, the arcing across the open poles of the controllable circuit breaker is less severe.

The predetermined delay (between lowering/interrupting the current in the second set of stator windings, and lowering/interrupting the current in the first set of stator windings) may be smaller than 25 ms, such as smaller than 20 ms, such as smaller than 15 ms, such as smaller than 10 ms. A delay between of 5-10 ms should be sufficient to ensure that the mutual coupling between the first and second sets of stator windings has terminated whereby the circuit breaker connected to the first set of stator windings can, in a safe manner, be brought into a none-conducting state of operation as only the current from a single set of stator windings is interrupted.

PMGs may comprise more than two sets of stator windings. The method according to the first aspect may thus further comprise the step of interrupting the current in one or more additional sets of stator windings of the PMG prior to interrupting the current in the first set of stator windings. The interruption of the currents in the one or more additional sets of stator windings and, after the predetermined delay, in the first set of stator windings may be provided by bringing respective controllable circuit breakers connected to the one or more additional sets of stator windings and the first set of stator windings into a none-conducting state of operation.

With respect to timing, the current in the second set of stator windings and the current in the one or more additional sets of stator windings may be interrupted essentially simultaneously. This approach is advantageous due to its simple implementation where the current in all healthy sets of stator windings are interrupted essentially at the same time. Alternatively, the current in the second set of stator windings and the current in the one or more additional sets of stator windings may be interrupted in accordance with a predetermined sequence having a duration not exceeding the predetermined delay. One approach may involve that the currents in the second and in the one or more additional sets of stator windings are interrupted in accordance with the respective current levels so that the highest current is interrupted first.

Regardless of the method applied, the current in the second set of stator windings and the current in the one or more additional sets of stator windings need to be significantly lowered, such as completely interrupted, before the current in the first set of stator windings is interrupted.

The first, second and/or one or more additional sets of stator windings may comprise sets of multi-phase stator windings, such as sets of three-phase stator windings. In case the stator windings involve three-phase stator windings the windings may be coupled in a star connection. With respect to nominal values, the sets of stator windings may have a nominal voltage within the range of 600 to 1000 V RMS, and a nominal frequency within the range of 100 to 160 Hz. In overspeed scenarios the frequency may reach 180 Hz.

In a second aspect, the present invention relates to a power generating assembly comprising a PMG comprising at least first and second sets of stator windings, wherein each set of stator windings is connected to a power converter via a controllable circuit breaker, wherein the power generating assembly further comprises
    a sensor configured for detecting a fault associated with the first set of stator windings, and
    a controller configured for lowering, such as interrupting, the current in the second set of stator windings, and, after a predetermined delay, lowering, such as interrupting, the current in the first set of stator windings in response to the detected fault.

Thus, the present invention relates, in its second aspect, to a power generating assembly for carrying out the method according to the first aspect. According to the second aspect a controller is configured for lowering, such as interrupting, current in a healthy second set of stator windings, i.e. not faulty stator windings, prior to lowering, such as interrupting, the current in the faulty first set of stator windings. As already mentioned, this is advantageous in that the current in a healthy second set of stator windings contributes significantly to the PMG fault current in the first set of stator windings due to a mutual coupling between the first and second sets of stator windings, in the PMG. Thus, by lowering, such as interrupting, the current in a healthy second set of stator windings, the PMG fault current in the first set of stator windings is also lowered and thus easier to interrupt with a circuit breaker.

Again, the mutual coupling from the healthy second set of stator windings to the faulty first set of stator windings may increase the PMG fault current by 320%.

The power generating assembly according to the second aspect may form part of a wind turbine generator.

Again, the term "fault" should be understood as any electrical fault, including a short circuit, in a closed circuit and/or in a power converter associated with a stator winding.

As already mentioned, each power converter may comprise at least an AC/DC converter where the AC terminals of each power converter is adapted to receive power from the PMG. The DC terminals of each power converter may be connected to a DC grid which may be either onshore or offshore. Alternatively, each power converter may further comprise a DC/AC converter separated from the AC/DC converter by a DC-link thus forming a full-scale frequency converter. As previously mentioned, both the AC/DC and DC/AC converters comprise controllable switches typically in the form of IGBTs. The nominal power of the PMG may be several MWs.

As discussed in relation to the first aspect the power converters and the sets of stator windings of the PMG may be connected in various ways. In one approach a distinct and separate power converter may be connected to each set of stator windings, whereas in another approach a power converter may be connected to several sets of stator windings.

Again, the term "lowered" should be understood broadly. Thus, the currents in the first and second sets of stator windings may in principle be reduced to lower current levels in the event of a fault, although an interruption of the currents, and thus a complete nullification of the currents, in the first and second sets of stator windings may be preferred in the event of a fault.

The controller of the power generating assembly may be configured for interrupting the current in the second set of stator windings by dispatching a control signal to the controllable circuit breaker connected to the second set of stator windings to bring this circuit breaker into a none-conducting state of operation. Similarly, the controller may be configured for interrupting the current in the first set of stator windings by dispatching a control signal to the controllable circuit breaker connected to the first set of stator windings to bring this circuit breaker into a none-conducting state of operation. By bringing the circuit breakers connected to the first and second sets of stator windings into none-conducting states of operation the currents in these sets of stator windings are effectively interrupted, i.e. nullified.

As previously discussed, the controllable IGBTs of the AC/DC and/or DC/AC converters may optionally also be controlled in a manner to lower/interrupt the current in the first and/or second set of stator windings. For example, the current in the second set of stator windings (healthy stator windings) may be interrupted using the controllable IGBTs if the PMG is operating at lower RPMs and thus with a lower VBEMF. With a lower VBEMF the associated controllable circuit breaker has an increased current interrupting capability due to the lower voltage. Also, the arcing across the open poles of the controllable circuit breaker is less severe.

The predetermined delay (between lowering/interrupting the current in the second set of stator windings, and lowering/interrupting the current in the first set of stator windings) may be smaller than 25 ms, such as smaller than 20 ms, such as smaller than 15 ms, such as smaller than 10 ms. As already mentioned, a delay between of ms should be sufficient to ensure that the mutual coupling between the first and second sets of stator windings has terminated whereby the circuit breaker connected to the first set of stator windings can, in a safe manner, be brought into a none-conducting state of operation as only the current from a single set of stator windings is interrupted.

PMGs may, as mentioned above, comprise more than two sets of stator windings. Thus, the controller may be configured for interrupting the current in one or more additional sets of stator windings of the PMG prior to interrupting the current in the first set of stator windings by dispatching control signals to respective controllable circuit breakers connected to the one or more additional sets of stator windings and the first set of stator windings. The interruption of the currents in the one or more additional sets of stator windings and, after the predetermined delay, in the first set of stator windings may be provided by bringing respective controllable circuit breakers connected to the one or more additional sets of stator windings and the first set of stator windings into a none-conducting state of operation in response to the dispatched control signals.

With respect to timing, the current in the second set of stator windings and the current in the one or more additional sets of stator windings may be interrupted essentially simultaneously. This approach is advantageous due to its simple implementation where the current in all healthy sets of stator windings are interrupted essentially at the same time. Alternatively, the current in the second set of stator windings and the current in the one or more additional sets of stator windings may be interrupted in accordance with a predetermined sequence having a duration not exceeding the predetermined delay. One approach may involve that the currents in the second and in the one or more additional sets of stator windings are interrupted in accordance with the respective current levels so that the highest current is interrupted first.

Regardless of the method applied, the current in the second set of stator windings and the current in the one or more additional sets of stator windings need to be significantly lowered, such as completely interrupted, before the current in the first set of stator windings is interrupted.

The first, second and/or one or more additional sets of stator windings may comprise sets of multi-phase stator windings, such as sets of three-phase stator windings. In case the stator windings involve three-phase stator windings the windings may be coupled in a star connection. With respect to nominal values, the sets of stator windings may have a nominal voltage within the range of 600 to 1000 V RMS, and a nominal frequency within the range of 100 to 160 Hz. In overspeed scenarios the frequency may reach 180 Hz.

In a third aspect the present invention relates to a wind turbine generator comprising a power generating assembly according to the second aspect. The wind turbine generator may further comprise a tower onto which a rotatable nacelle is arranged. The PMG, the controllable circuit breakers and the power converters may be arranged inside the nacelle of the wind turbine generator. Alternatively, the controllable circuit breakers and the power converters may be arranged at the ground, such as next to the tower of the wind turbine generator. Moreover, a set of rotatable rotor blades is operatively connected to the shaft of the PMG—typically through a gearbox. The wind turbine generator according to the third aspect may form part of a wind power plant comprising a plurality of wind turbine generators.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
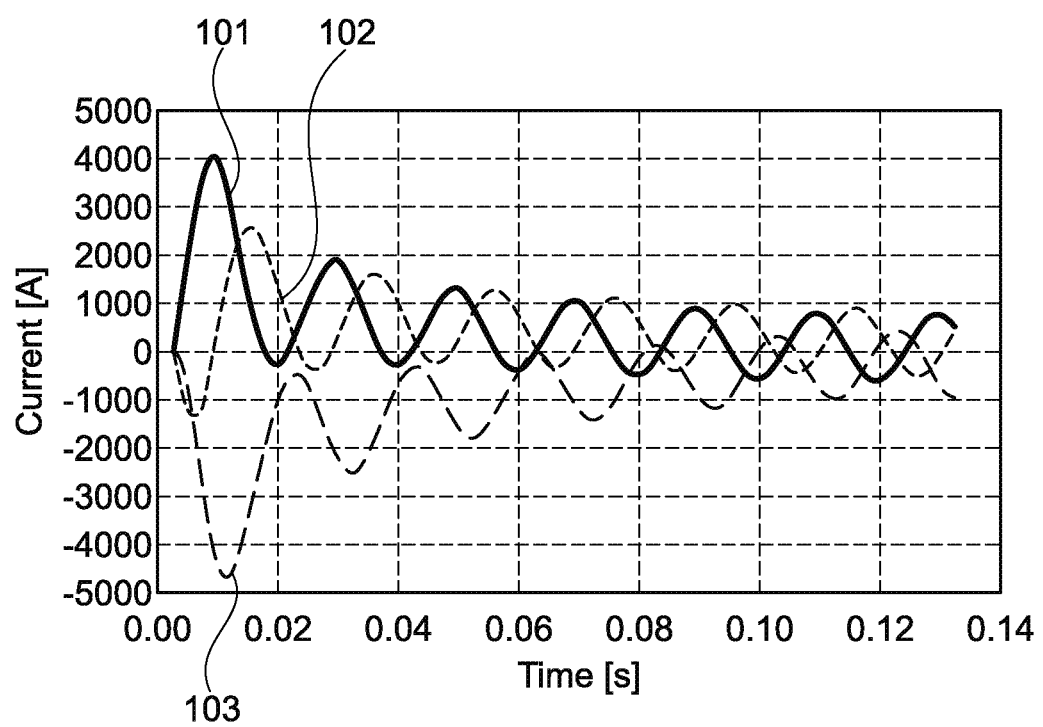
FIG. 1 shows an example of a PMG fault current (lower curve) with no zero crossings within the first several half periods.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In general, the present invention relates to a method for operating a power generating assembly comprising a PMG comprising a plurality of sets of stator windings. The present invention relates, in particular, to a method for operating the power generating assembly when at least one of sets of stator windings of the PMG is exposed to a fault, such as a short-circuit. The present invention further relates to a power generating assembly comprising a PMG comprising a plurality of sets of stator windings connected to respective power converters via respective controllable circuit breakers, and to a wind turbine generator comprising such a power generating assembly.

Referring now to FIG. 1, a typical result of a PMG short circuit event is depicted. As seen in FIG. 1 one phase 103 is off-set relative to the two other phases 101, 102. The off-set phase 103 has no zero crossings within first four half periods. The lack of zero crossings is disadvantageous in that it becomes very difficult to interrupt the PMG fault current with a controllable circuit breaker as the electrical arc will not extinguish until the first zero crossing is reached. This lack of extinguishment may potentially damage and/or increase wear and thus shorten the lifetime of the controllable circuit breaker.

Figure 2:
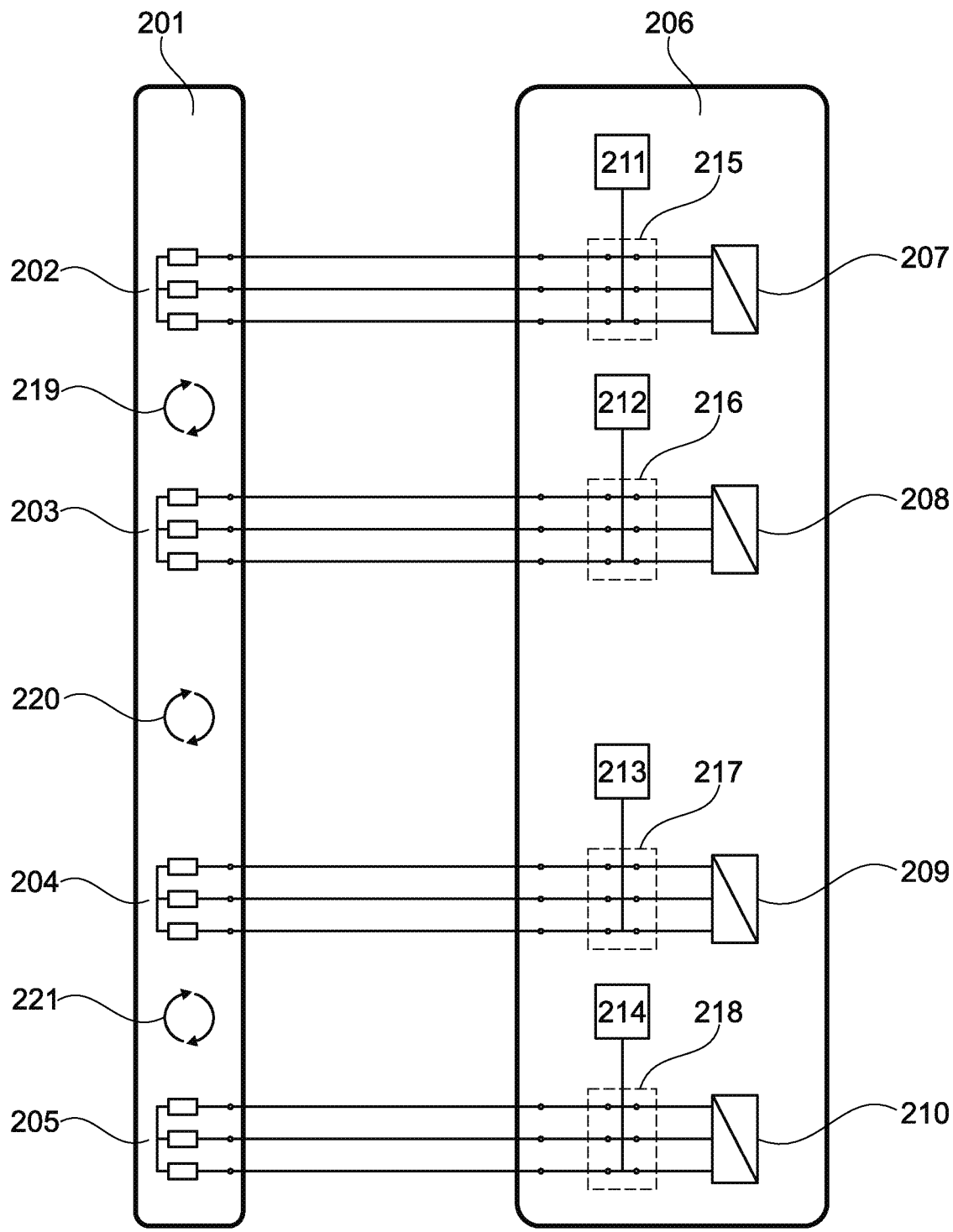
FIG. 2 shows a PMG with four sets of three-phase stator windings during normal operation.

Turning now to FIG. 2 a power generating assembly comprising a PMG 201 and a circuit breaker/converter unit 206 is depicted. As seen in FIG. 2 the PMG 201 comprises four sets of three-phase stator windings 202-205. Each set of stator windings 202-205 is coupled in a star connection. The number of sets of stator windings of the PMG 201 may of course differ from the four sets depicted in FIG. 2. Also, the number of phases may differ from the three phases depicted in FIG. 2. The nominal voltage of the PMG 201 may be around 800 V RMS, and the nominal frequency may be within the range of 100 to 160 Hz—and even 180 Hz in overspeed scenarios. The nominal power of the PMG 201 may be several MWs.

The four sets of stator windings 202-205 are mutually coupled inside the stator of the PMG 201 as indicated by the symbols 219-221 whereby the current flowing in one set of stator windings will influence the current flowing in one or more others sets of stator windings. This influence may be as high as 320%. The circuit breaker/converter unit 206 comprises for each set of stator windings 202-205 respective controllable circuit breakers 215-218 and respective power converters 207-210. Thus, power generating assembly depicted in FIG. 2 is configured as follows:
  stator windings 202 are connected to power converter 207 via controllable circuit breaker 215,
  stator windings 203 are connected to power converter 208 via controllable circuit breaker 216,
  stator windings 204 are connected to power converter 209 via controllable circuit breaker 217, and
  stator windings 205 are connected to power converter 210 via controllable circuit breaker 218.

As further depicted in FIG. 2 a controller 211-214 is associated with each of the controllable circuit breakers 215-218. The controllers 211-214, which are configured to dispatch control signals to the respective controllable circuit breakers 215-218, may be distinct and thus separate controllers or they may form part of the respective power converters 207-210.

In terms of operation FIG. 2 depicts a normal state of operation where all controllable circuit breakers 215-218 are in a conducting state of operation, and power may be provided from all sets of stator windings 202-205 to the respective power converters 207-210.

Both the PMG 201 and the circuit breaker/converter unit 206 may be arranged within a nacelle of a wind turbine generator. Alternatively, the circuit breaker/converter unit 206 may be arranged at the ground next to the tower of the wind turbine generator.

Figure 3:
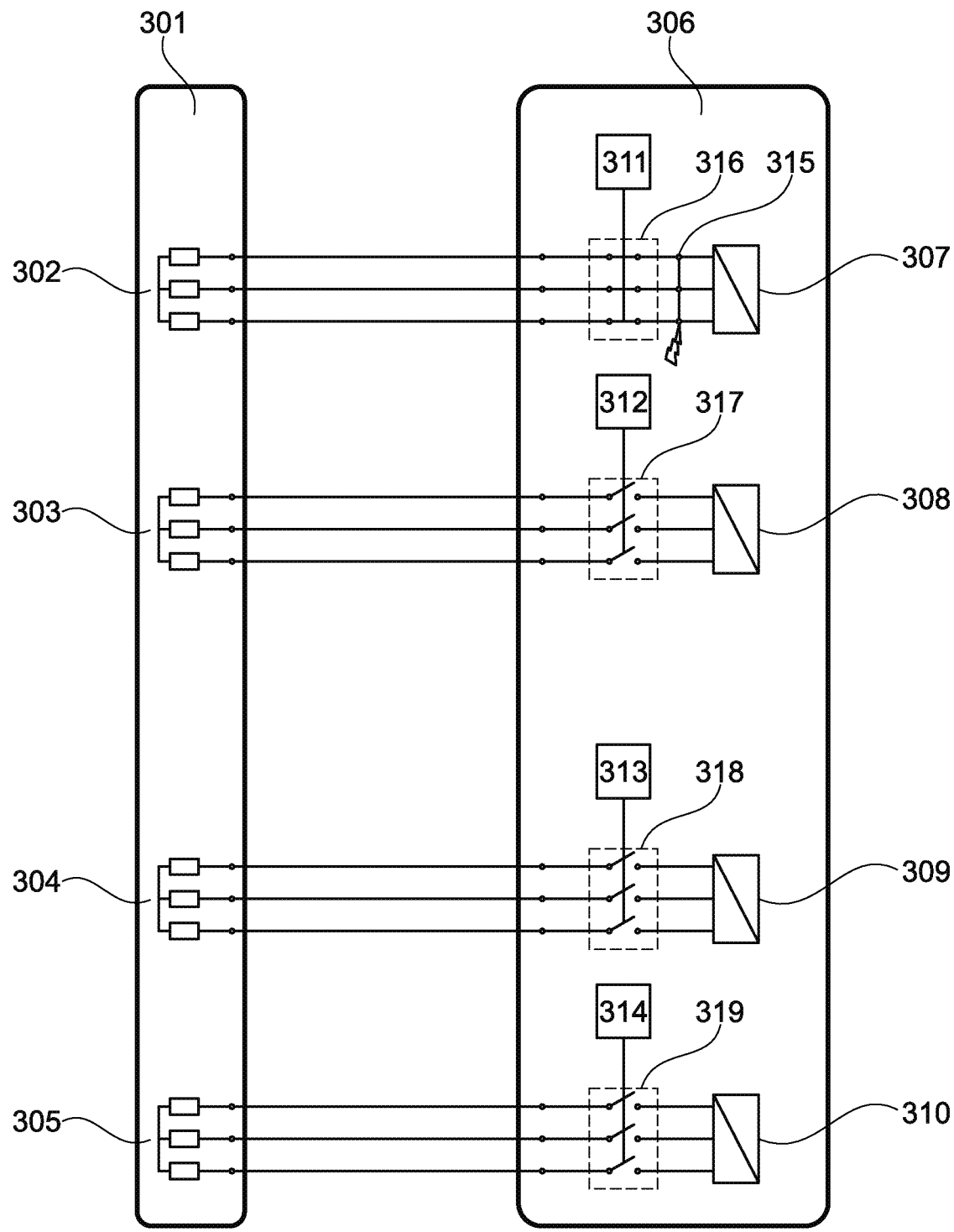
FIG. 3 shows a PMG with four sets of three-phase stator windings where the current in three sets of stator windings are interrupted due to a short-circuit fault in the upper set of three-phase stator windings.

Referring now to FIG. 3 a short circuit 315 has been detected in the circuit breaker/converter unit 306 in relation to the upper set of stator windings 302 of the PMG 301 while the circuits associated with other sets of stator windings 303-305 are healthy. Again, stator windings 302 are connected to power converter 307 via controllable circuit breaker 316 although the short circuit 315 has been detected. The healthy sets of stator windings 303-305 have been disconnected from the respective power converters 308-310 by bringing the respective controllable circuit breakers 312-314 into a none-conducting state of operation. The reason for this will be explained in further details below. Moreover, a controller 311-314 for dispatching control signals is associated with each of the controllable circuit breakers 316-319. Again, the controllers 311-314 may be distinct and thus separate controllers or they may form part of the respective power converters 307-310.

The detected short circuit current in the circuit relating to the upper set of stator winding 302 of the PMG 301 is significantly larger than the nominal current. Moreover, as long as the controllable circuit breakers 317-319 are in a conducting state of operation (as depicted in FIG. 2) the mutual coupling between the sets of stator windings in the PMG 301 will further increase the short circuit current in the circuit relating to the upper set of stator windings 302. This unintended further increase of the short circuit current is disadvantageous in that it may, for example, damage the controllable circuit breaker 316.

In order to prevent the unintended further increase of the short circuit current (due to the mutual coupling between the sets of stator windings), the controllable circuit breakers 317-319 are, as depicted in FIG. 3, brought into a none-conducting state of operation whereby the current flowing in the circuits associated with the sets of stator windings 303-305 are interrupted. This interruption terminates the mutual coupling to the upper set of stator windings 302 whereby the short circuit current decreases significantly so that the controllable circuit breaker 316 can be brought into a none-conducting state of operation after a predetermined delay. As previously discussed, the predetermined delay may be smaller than 25 ms, such as smaller than 20 ms, such as smaller than 15 ms, such as smaller than 10 ms. In fact a predetermined delay between of 5-10 ms should be sufficient to ensure that only the short circuit current is interrupted when controllable circuit breaker 316 is brought into a none-conducting state of operation as depicted in FIG. 4.

The controllable circuit breakers 317-319 may be brought into the none-conducting state of operation essentially simultaneously by dispatching control signals from the controllers 312-314 to the controllable circuit breakers 317-319 at essentially the same time. Alternatively, the controllable circuit breakers 317-319 may be brought into the none-conducting state of operation in accordance with a predetermined sequence having a duration not exceeding the predetermined delay. As an example, the currents of the healthy circuits associated with the sets of stator windings 303-305 may be interrupted, i.e. nullified, in accordance with the levels of the currents where the highest current is interrupted first.

Figure 4:
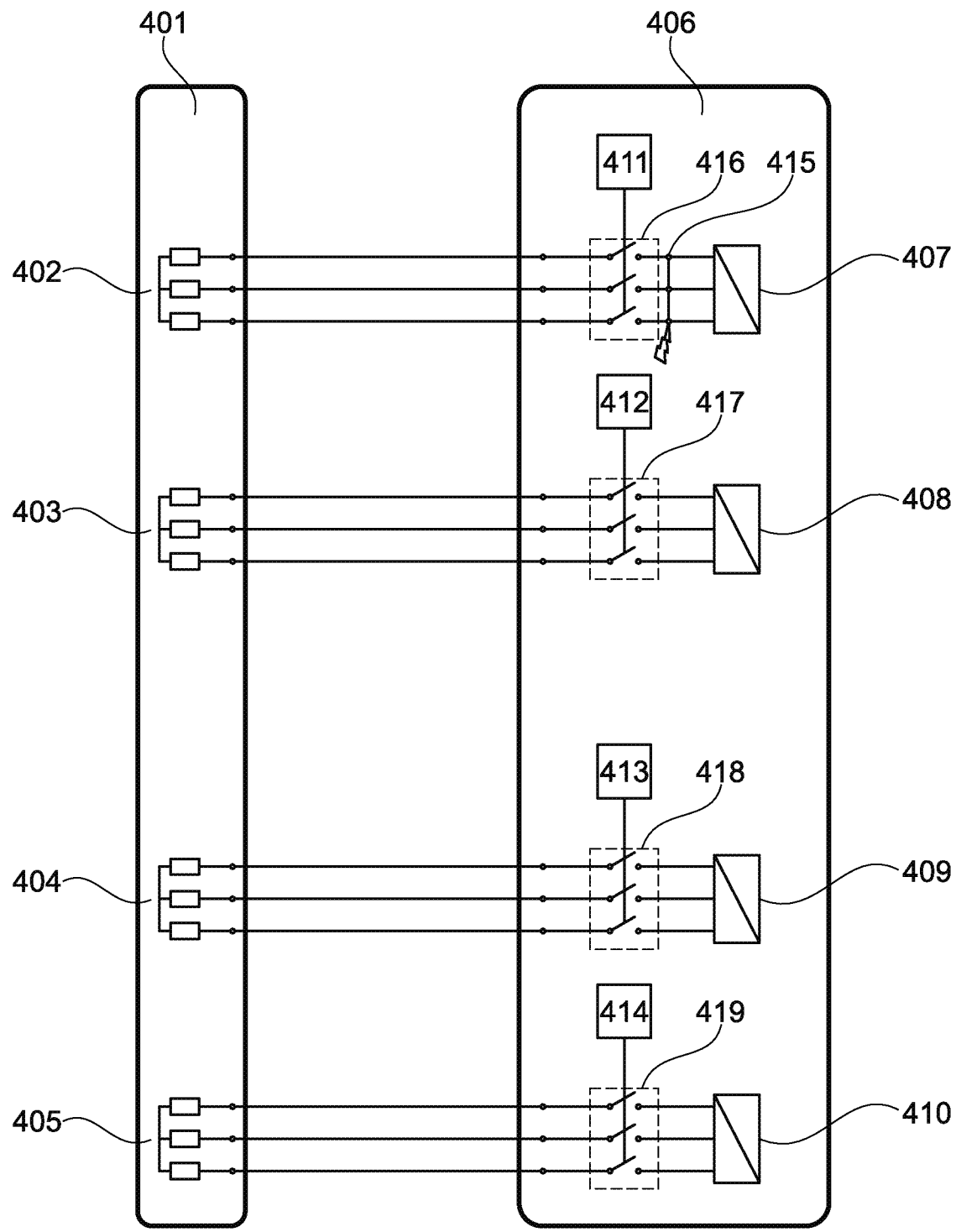
FIG. 4 shows a PMG with four sets of three-phase stator windings where the current in all sets of stator windings are interrupted.

Turning now to FIG. 4 all controllable circuit breakers 416-419 in the circuit breaker/converter unit 406 have been brought into the none-conducting state of operation, and the influence of the short circuit 415 has been overcome. Again, the four sets of stator windings 402405 are configured to be connected to respective power converters 407-410 via respective controllable circuit breaker 416-419 each being controlled by respective controllers 411-414 which may be distinct and thus separate controllers, or controllers forming part of the respective power converters 407-410.

Figure 5:
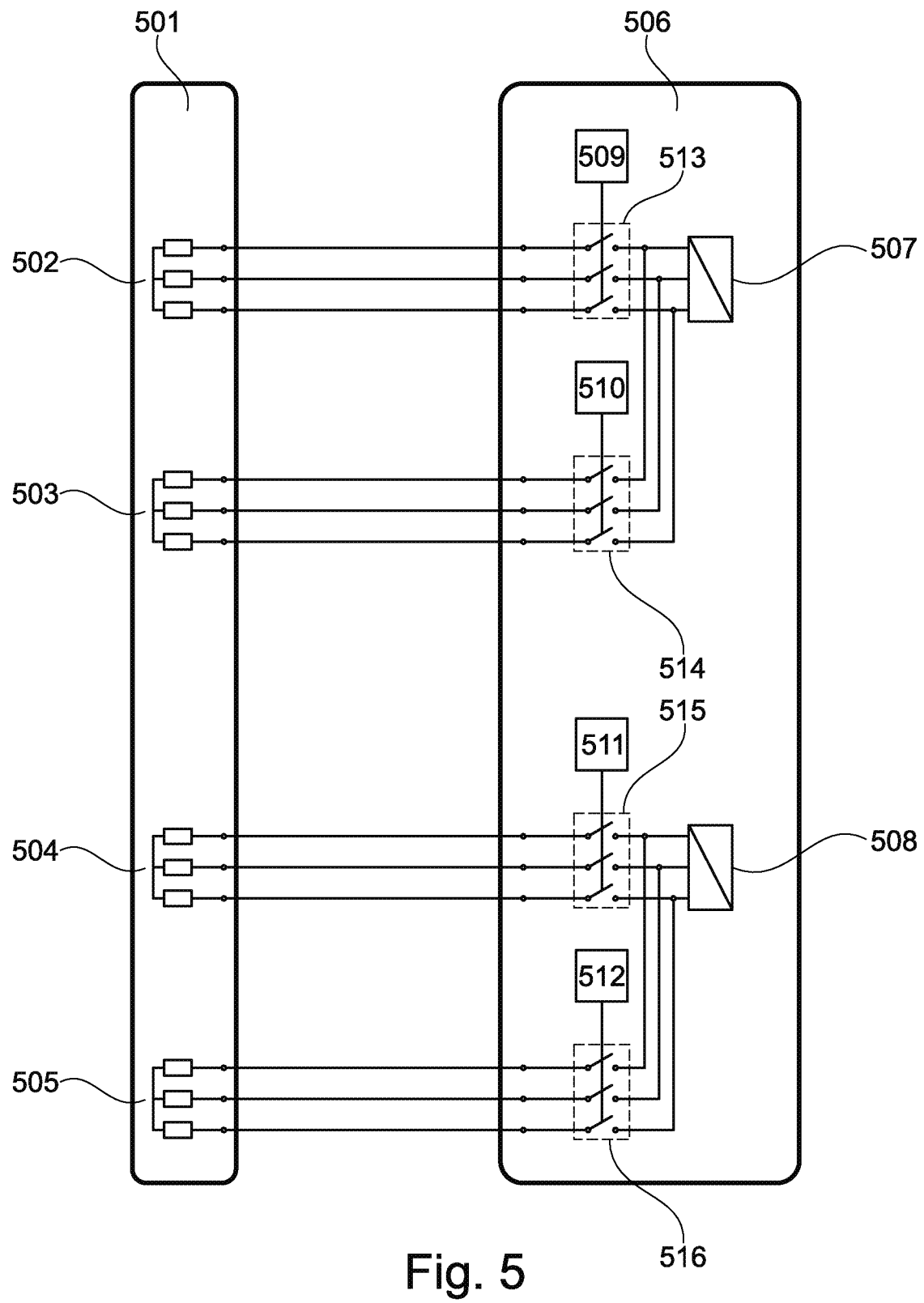
FIG. 5 shows how sets of three-phase stator windings can share power converters.

A different configuration of the power generating assembly (PMG 501 and circuit breaker/converter unit 506) is depicted in FIG. 5 where power converter 507 is adapted to received power from two sets of stator windings 502, 503 via respective controllable circuit breakers 513, 514 controlled by respective controllers 509, 510, and power converter 508 is adapted to received power from two sets of stator windings 504, 505 via respective controllable circuit breakers 515, 516 controlled by respective controllers 511, 512. In this configuration the power converters 507, 508 are capable of handling power from not only one set of stator windings, but two sets of stator windings. The configuration depicted in FIG. 5 is advantageous in that the total number of power devices of the power generating assemble is reduced. Moreover, merging two smaller power converters into one bigger power converter may also reduce the overall costs.

The nominal voltage of the PMGs in FIGS. 2-5 may be around 800 V RMS, and the nominal frequency may be within the range of 100 to 160 Hz—and even 180 Hz in overspeed scenarios. The nominal power of the PMGs may be several MWs. Moreover, the number of sets of stator windings of the PMGs may differ from the depicted four sets, and the number of phases of each set may differ from the depicted three phases.

Even further, each of the power converters depicted in FIGS. 2-5 may comprise at least an AC/DC converter adapted to receive power from a PMG, and provide power to a DC grid which may be either onshore or offshore. Alternatively, each power converter may further comprise a DC/AC converter separated from the AC/DC converter by a DC-link thus forming a full-scale frequency converter. Both the AC/DC converter and the DC/AC converter comprise controllable switches typically in the form of IGBTs. As previously mentioned, the controllable IGBTs of the AC/DC converter and/or the DC/AC converter may optionally also be controlled in a manner to lower the current in one or more sets of stator windings in case of a fault event.

The invention claimed is:

1. A method for operating a power generating assembly in event of a fault, wherein the power generating assembly comprises a permanent magnet generator comprising at least first and second sets of stator windings, wherein each set of stator windings is connected to a power converter via a controllable circuit breaker, the method comprising:
   detecting a fault associated with the first set of stator windings; and
   lowering, by interrupting, current in the second set of stator windings, and, after a predetermined delay, lowering, by interrupting, current in the first set of stator windings.

2. The method of claim 1, wherein the current in the second set of stator windings is interrupted by bringing the controllable circuit breaker connected to the second set of stator windings into a none-conducting state of operation.

3. The method of claim 1, wherein the current in the first set of stator windings is interrupted by bringing the controllable circuit breaker connected to the first set of stator windings into a none-conducting state of operation.

4. The method of claim 1, wherein the predetermined delay is smaller than 25 ms.

5. The method of claim 1, further comprising interrupting current in one or more additional sets of stator windings of the permanent magnet generator prior to interrupting the current in the first set of stator windings by bringing respective controllable circuit breakers connected to the one or more additional sets of stator windings and the first set of stator windings into a none-conducting state of operation.

6. The method of claim 5, wherein the current in the second set of stator windings and the current in the one or more additional sets of stator windings are interrupted essentially simultaneously, or wherein the current in the second set of stator windings and the current in the one or more additional sets of stator windings are interrupted in accordance with a predetermined sequence having a duration not exceeding the predetermined delay.

7. The method of claim 1, wherein at least one of the first set of stator windings, the second set of stator windings, and and/or one or more additional sets of stator windings comprise sets of multi-phase stator windings.

8. A power generating assembly comprising a permanent magnet generator comprising at least first and second sets of stator windings, wherein each set of stator windings is connected to a power converter via a controllable circuit breaker, wherein the power generating assembly further comprises:
   a sensor configured for detecting a fault associated with the first set of stator windings; and
   a controller configured for lowering, by interrupting, current in the second set of stator windings, and, after a predetermined delay, lowering, by interrupting, current in the first set of stator windings in response to the detected fault.

9. The power generating assembly according to claim 8, wherein the controller is configured for interrupting the current in the second set of stator windings by dispatching a control signal to the controllable circuit breaker connected to the second set of stator windings to bring this circuit breaker into a none-conducting state of operation.

10. The power generating assembly according to claim 8, wherein the controller is configured for interrupting the current in the first set of stator windings by dispatching a control signal to the controllable circuit breaker connected to the first set of stator windings to bring this circuit breaker into a none-conducting state of operation.

11. The power generating assembly according to claim 8, wherein the predetermined delay is smaller than 25 ms.

12. The power generating assembly according to claim 8, wherein the controller is configured for interrupting the current in one or more additional sets of stator windings of the permanent magnet generator prior to interrupting the current in the first set of stator windings by dispatching control signals to respective controllable circuit breakers connected to the one or more additional sets of stator windings and the first set of stator windings to bring the respective circuit breakers into a none-conducting state of operation.

13. The power generating assembly according to claim 12, wherein the controller is configured for interrupting the current in the second set of stator windings and interrupting the current in the one or more additional sets of stator windings essentially simultaneously, or wherein the controller is configured for interrupting the current in the second set of stator windings and interrupting the current in the one or more additional sets of stator windings in accordance with a predetermined sequence having a during not exceeding the predetermined delay.

14. The power generating assembly according to claim 8, wherein the sets of stator windings comprise sets of multi-phase stator windings.

15. A wind turbine generator comprising a power generating assembly, comprising:

a permanent magnet generator comprising at least first and second sets of stator windings, wherein each set of stator windings is connected to a power converter via a controllable circuit breaker;

a sensor configured for detecting a fault associated with the first set of stator windings; and a controller configured for lowering, by interrupting, current in the second set of stator windings, and, after a predetermined delay, lowering, by interrupting, current in the first set of stator windings in response to the detected fault.

\* \* \* \* \*